US012337452B2

(12) United States Patent
Jiang et al.

(10) Patent No.: US 12,337,452 B2
(45) Date of Patent: Jun. 24, 2025

(54) LOCKING DEVICE FOR ELECTRIC NAIL GUN POWERED BY GAS SPRING

(71) Applicants: Zhonghua Jiang, Zhejiang (CN); Shifu Qiu, Zhejiang (CN); Zien Jin, Zhejiang (CN); Jianguang Jin, Zhejiang (CN); Xiaorong Li, Zhejiang (CN); Xiaopeng Li, Zhejiang (CN); Fazheng Yang, Zhejiang (CN)

(72) Inventors: Zhonghua Jiang, Zhejiang (CN); Shifu Qiu, Zhejiang (CN); Zien Jin, Zhejiang (CN); Jianguang Jin, Zhejiang (CN); Xiaorong Li, Zhejiang (CN); Xiaopeng Li, Zhejiang (CN); Fazheng Yang, Zhejiang (CN)

(73) Assignee: Zhejiang Rongpeng Air Tools Co., Ltd., Zhejiang (CN)

( * ) Notice: Subject to any disclaimer, the term of this patent is extended or adjusted under 35 U.S.C. 154(b) by 12 days.

(21) Appl. No.: 18/536,246

(22) Filed: Dec. 12, 2023

(65) Prior Publication Data

US 2025/0108494 A1 Apr. 3, 2025

(30) Foreign Application Priority Data

Sep. 28, 2023 (CN) ......................... 202322641181.3

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .......... B25C 1/047; B25C 1/008; B25C 1/04; B25C 1/06; B25C 1/08; B25C 1/003
See application file for complete search history.

(56) References Cited

U.S. PATENT DOCUMENTS

2021/0347023 A1* 11/2021 Carrier ...................... B25C 1/06
2021/0354276 A1* 11/2021 Zhang ...................... B25C 1/047

* cited by examiner

*Primary Examiner* — Veronica Martin

(57) ABSTRACT

A locking device for an electric nail gun powered by a gas spring, comprising: a power box, a striker, a fixed central shaft having a notch, a rotatable locking block on the fixed central shaft, which by rotating engages or disengages from the notch to lock or unlock the striker, a tension spring, a guide pad, synchronously rotating with the fixed central shaft and located above the locking block, with the upper part of the guide pad being secured by a lock nut, a pressure plate on the power box, fixed and perpendicular to the striker, secured by a first bolt and a second bolt, a sleeve fitted over the first bolt, and an integral guide part of the guide pad, with its upper surface tightly against the underside of the pressure plate and its side surface closely adjacent to the sleeve.

9 Claims, 11 Drawing Sheets

LOCKING DEVICE FOR ELECTRIC NAIL GUN POWERED BY GAS SPRING

FIELD OF THE INVENTION

This present invention relates to a locking device for an electric nail gun powered by a gas spring.

BACKGROUND OF THE INVENTION

An electric nail gun is a tool that uses an electric motor as a driving source, a cylinder as an energy storage device, and a piston striker assembly as a driving component for nailing tasks. Typically, on one side of the striker's movement path, there is a lifting wheel driven by the motor. The unidirectional rotation of the lifting wheel can reset the striker from the firing position to the ready position. On the other side of the striker's movement path, there is a locking device. When the striker resets to the ready position, the locking device locks the striker in place. A utility model patent with the publication number CN215701434U discloses an example of such an electric nail gun in existing technology.

In the structure of the locking device of the electric nail gun, a locking block rotates around a fixed central shaft. The locking block engages or disengages from the notch of the striker to lock or unlock it. In existing electric nail guns, it has been found that the force of the striker can indirectly transfer to the fixed central shaft through the locking block. This results in the fixed central shaft experiencing torque and impact forces, causing rotation, loosening, or some degree of torsional deformation. Impact forces can cause the fixed central shaft to bend, leading to durability issues in the electric nail gun. Misalignment or deformation at the fixed central shaft can cause premature failure, affecting the normal operation of the nail gun.

SUMMARY OF THE INVENTION

In view of the deficiencies in the existing technology, the present invention provides a locking device for an electric nail gun powered by a gas spring.

To achieve the above objectives, the present invention provides a locking device for an electric nail gun powered by a gas spring. The device includes a locking device for an electric nail gun powered by a gas spring, comprising: a power box, a striker movably mounted above the power box with a plurality of evenly spaced ratchets formed on one side and a notch on the other, a fixed central shaft mounted above the power box on the side with the notch of the striker, a rotatable locking block on the fixed central shaft engaging or disengaging the notch to lock or unlock the striker, a tension spring on the power box resetting the locking block to a locked position, a guide pad maintaining synchronous rotation with the fixed central shaft and located above the locking block, a lock nut securing an upper part of the guide pad, a pressure plate on the power box, fixed perpendicular above the striker and to the striker by a first bolt and a second bolt, a sleeve fitted over the first bolt, the guide pad including an integral guide part, an upper surface of the integral guide part tightly against an underside of the pressure plate and a side surface of the guide part close to the sleeve.

More preferably, wherein a middle part of the fixed central shaft has an integral flat part, and the guide pad has a flat groove matching the flat part; the flat part is press-fitted into the flat groove to achieve synchronized rotation.

More preferably, wherein the first bolt is additionally equipped with a roller, positioned below the sleeve, to guide the movement of the striker.

More preferably, wherein a spring column is fixedly mounted on the locking block, and a tension spring bracket is also fixedly mounted on the power box; one end of the pull spring is attached to the tension spring bracket, and the other end of the pull spring is attached to the spring column, thereby maintaining the locking block in a tendency to reset to the locked position.

More preferably, wherein a limit piece is additionally installed on the fixed central shaft, located between the guide pad and the lock nut, and comprises an integral first limit end and a second limit end; upon installation, the first limit end abuts the first bolt, while the second limit end serves to restrict the position of the spring column.

More preferably, wherein the power box is equipped with an internal motor, and an output shaft of the motor has a cam; the cam is driven by a locking transmission assembly, rotates the locking block, thereby enabling the switching between locking and unlocking positions.

More preferably, wherein the locking transmission assembly includes a synchronization shaft, a locking seat, and a steel ball; the synchronization shaft is positioned on one side of the fixed central shaft, with a lower end of the synchronization shaft equipped with a pendulum rod; the pendulum rod has a torsion spring and forms a transmission connection with the cam to drive the rotation of the synchronization shaft through swinging; an upper end of the synchronization shaft has a synchronization wheel, an upper surface of the synchronization wheel is machined to form a ball groove; the locking seat, fixed in position, includes a lift hole machined for the passage of the steel ball; a lower surface of the locking block has machined to form a spherical groove.

More preferably, wherein the power box also fixed with a guide block; the locking seat and the guide block partially overlap on the upper surface of the synchronization wheel to ensure the stable rotation of the synchronization wheel.

Beneficial effects compared to existing technology: Through the arrangement of the guide pad, pressure plate, first bolt, and second bolt, the present invention effectively neutralizes the impact forces and torque experienced by the fixed central shaft, ensuring its stability during operation. This increases the durability of the electric nail gun and significantly extends its lifespan.

DETAILED DESCRIPTION OF THE EMBODIMENTS

Figure 1:
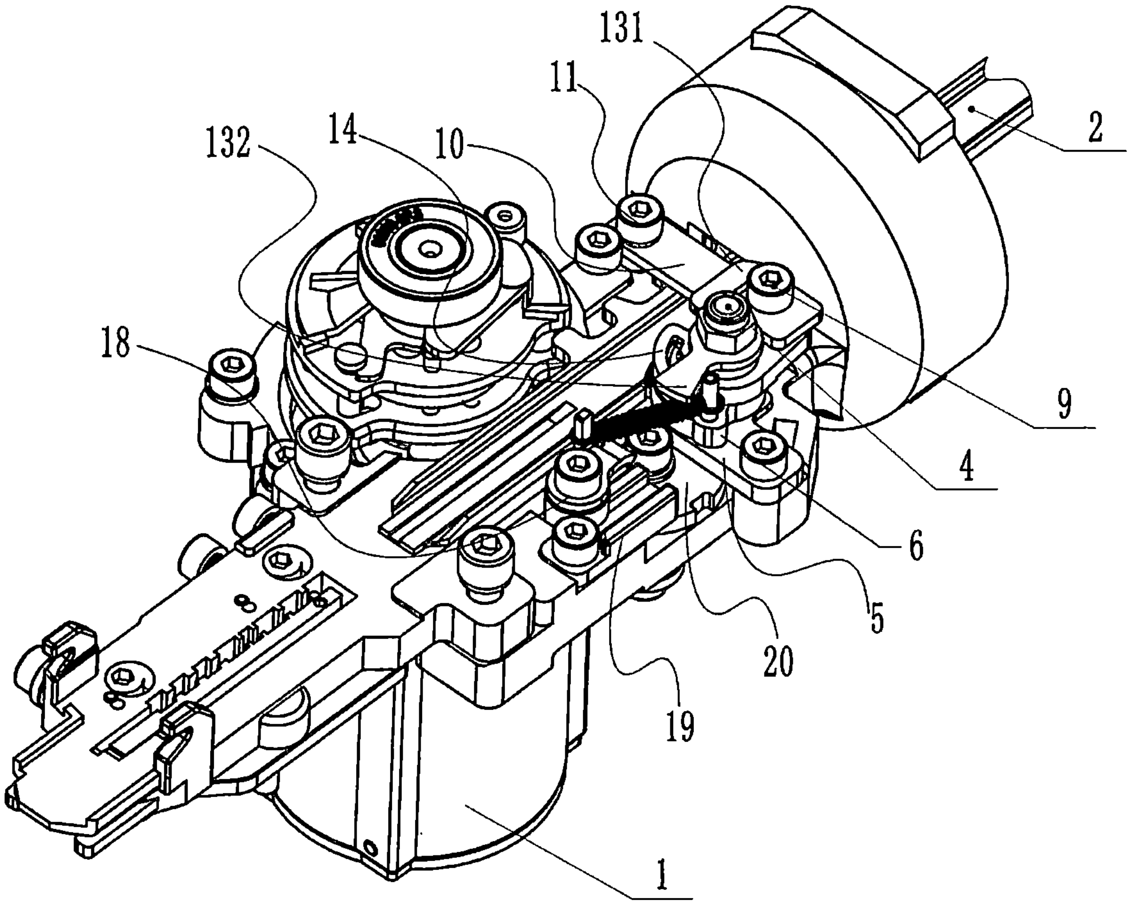
FIG. 1 is a three-dimensional view of the locking device for an electric nail gun powered by a gas spring.

Embodiment 1: As shown in FIGS. 1 to 4, the present invention embodiment of a locking device for an electric nail gun powered by a gas spring includes a power box 1 and a striker 2 movably set above the power box 1. The striker 2 has a plurality of ratchets machined at equal intervals on one side and a notch 2*a* on the other side. A lifting wheel is arranged on the side of the striker 2 with the ratchets. On the side of the power box 1 where the striker 2 has the notch 2*a*, a fixed central shaft 4 is installed. A rotatable locking block 6 is set on the fixed central shaft 4. The locking block 6 engages or disengages from the position of the notch 2*a* to lock or unlock the striker 2. A tension spring 17 is also installed on the power box 1, resetting the locking block 6 to the locking mode. The fixed central shaft 4 is equipped with a guide pad 14 that rotates synchronously with it and is located above the locking block 6. The guide pad 14 is locked at the top with a lock nut 12. The power box 1 is also equipped with a pressure plate 10, which is fixed by the first bolt 9 and the second bolt 11, and is set perpendicular to and above the striker 2. A sleeve 8 is fitted on the first bolt 9. The guide pad 14 includes an integral guide part 141, whose upper surface is closely attached under the pressure plate 10, and its side surfaces are closely attached to the sleeve 8.

Figure 5:
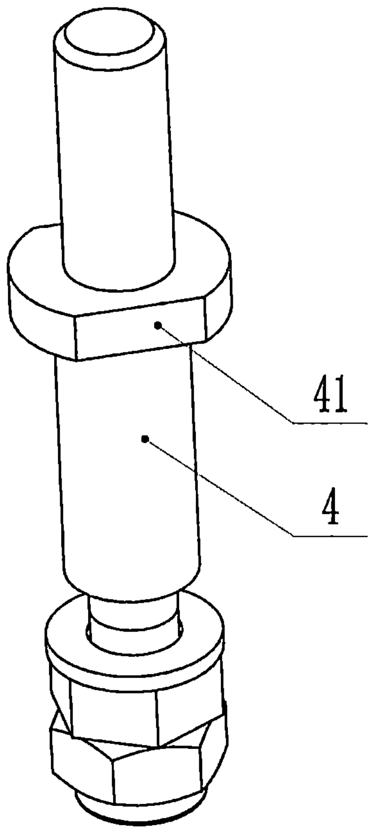
FIG. 5 is a schematic of the fixed central shaft.
Figure 6:
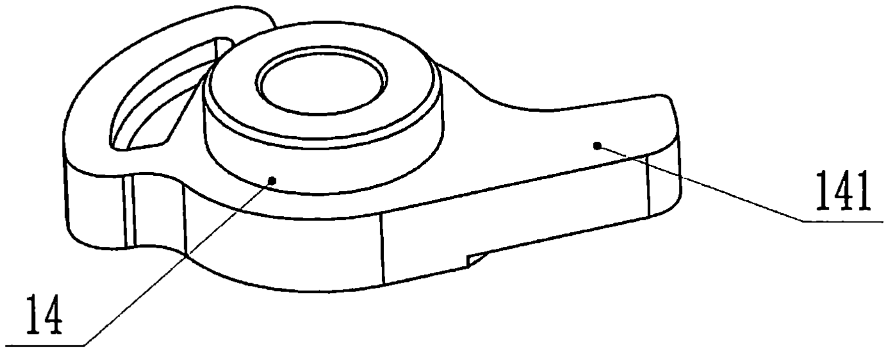
FIG. 6 and FIG. 7 are schematics of the guide pad.
Figure 7:
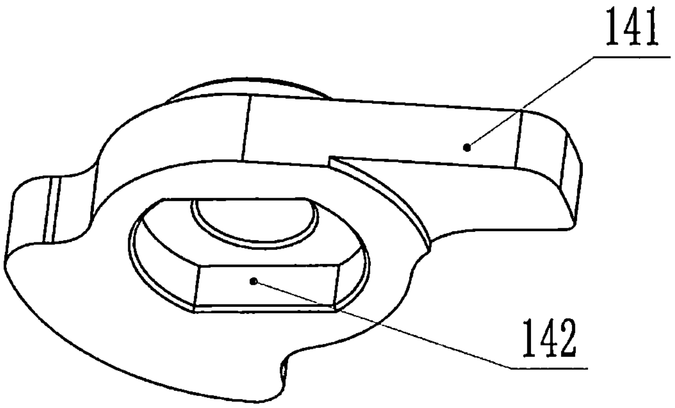

Referencing FIG. 5 and FIG. 7, the middle part of the fixed central shaft 4 includes an integrated flat part 41. The guide pad 14 has a flat groove 142 that matches the flat part 41. The flat part 41 is installed in the flat groove 142 with an interference fit to achieve synchronous rotation.

Figure 4:
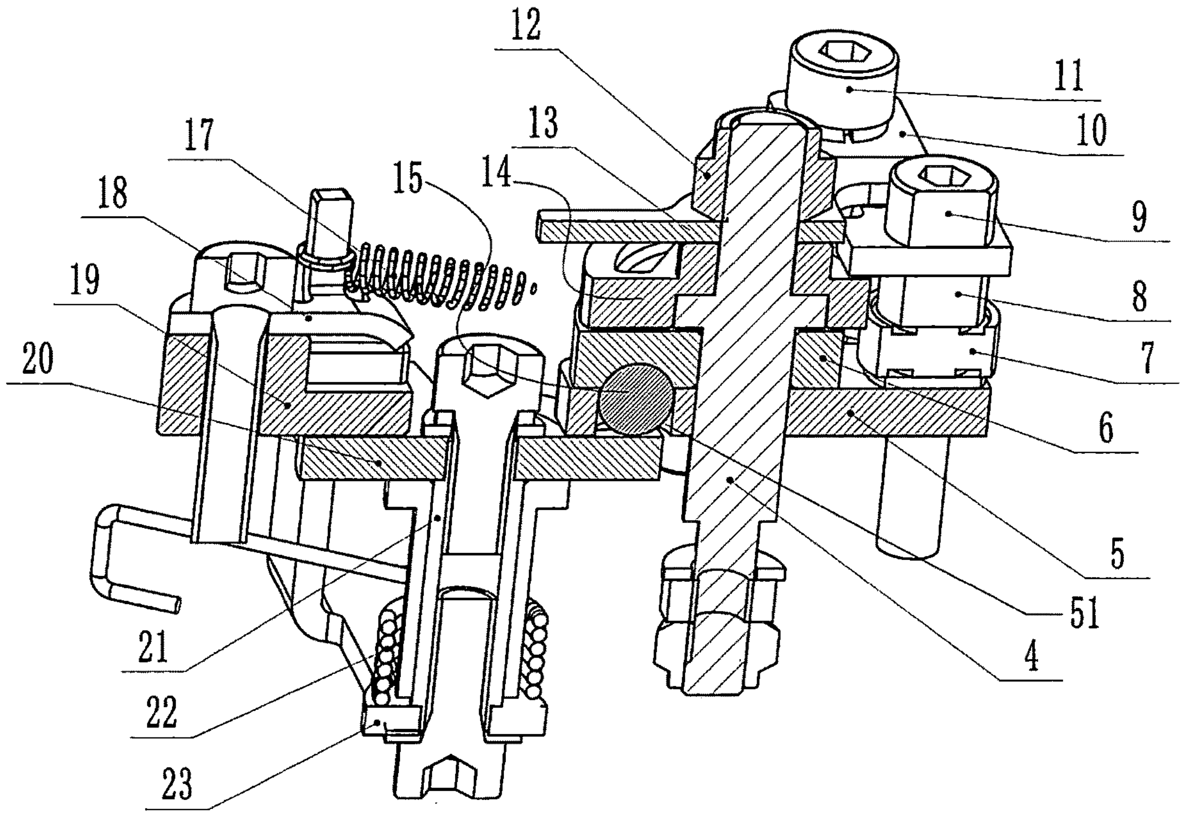
FIG. 4 is a sectional view of FIG. 3.

Referencing FIG. 4, the first bolt 9 is also equipped with a roller 7, which is located under the sleeve 8. The roller 7 acts as a guide for the movement of the striker 2.

Figure 3:
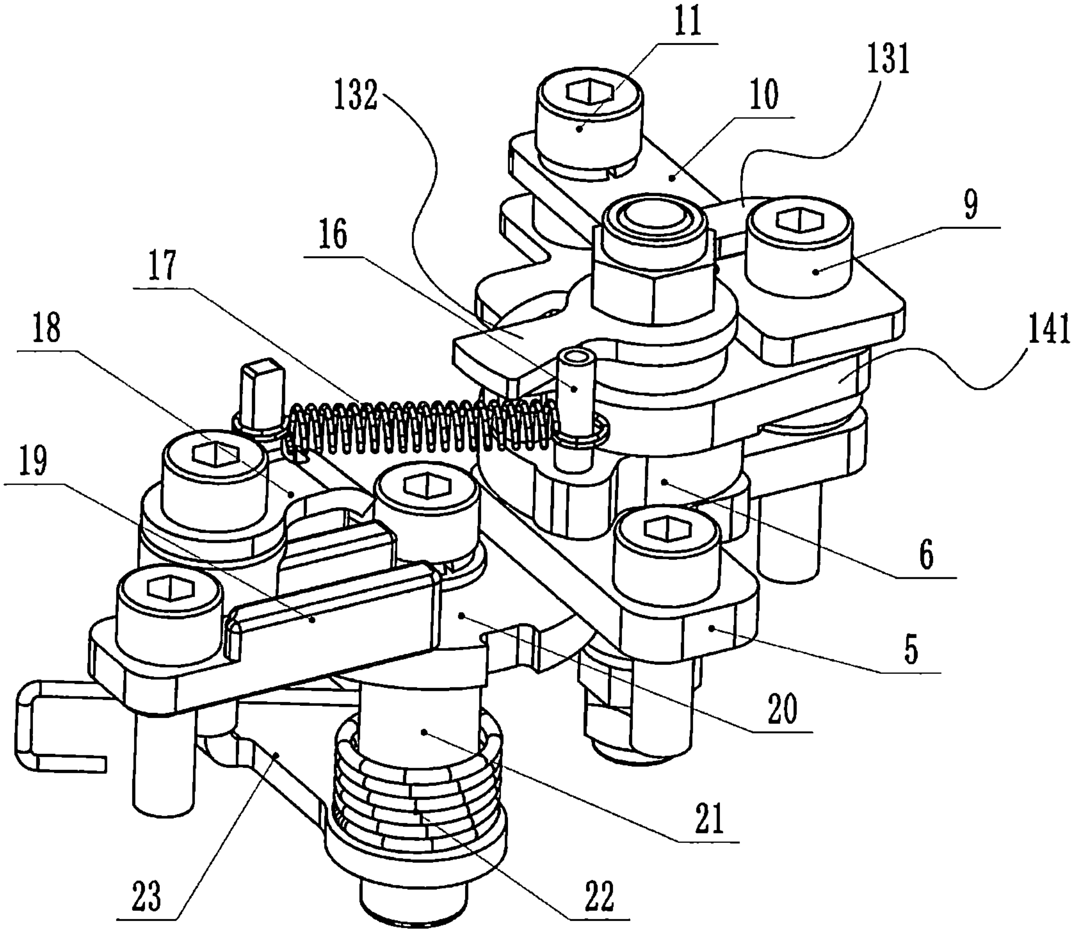
FIG. 3 depicts the structure of the bolt transmission component.

Referencing FIG. 3, a spring column 16 is fixed on the locking block 6. A tension spring bracket 18 is also fixed on the power box 1. One end of the tension spring 17 is pulled on the tension spring bracket 18, and the other end is pulled on the spring column 16, keeping the locking block 6 in a tendency to reset to the locking mode.

Figure 8:
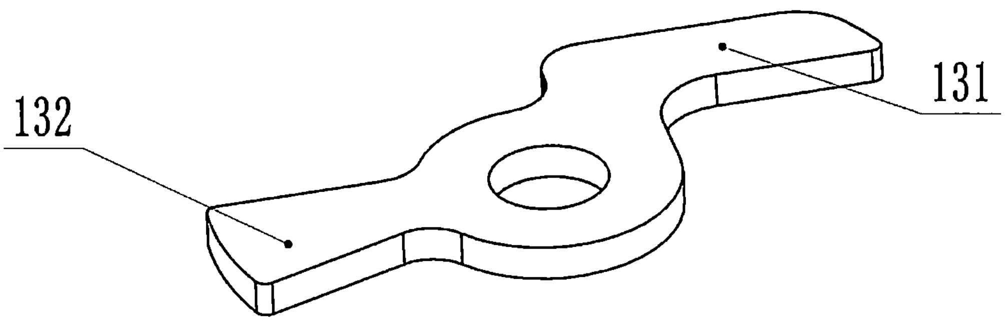
FIG. 8 shows the limit piece.

Referencing FIGS. 3, 4, and 8, a limit piece 13 is also set on the fixed central shaft 4. The limit piece 13 is located between the guide pad 14 and the lock nut 12. The limit piece 13 has an integrated first limit end 131 and a second limit end 132. Once positioned, the first limit end 131 is closely adjacent to the first bolt 9, and the second limit end 132 is used to restrict the position of the spring column 16.

Figure 2:
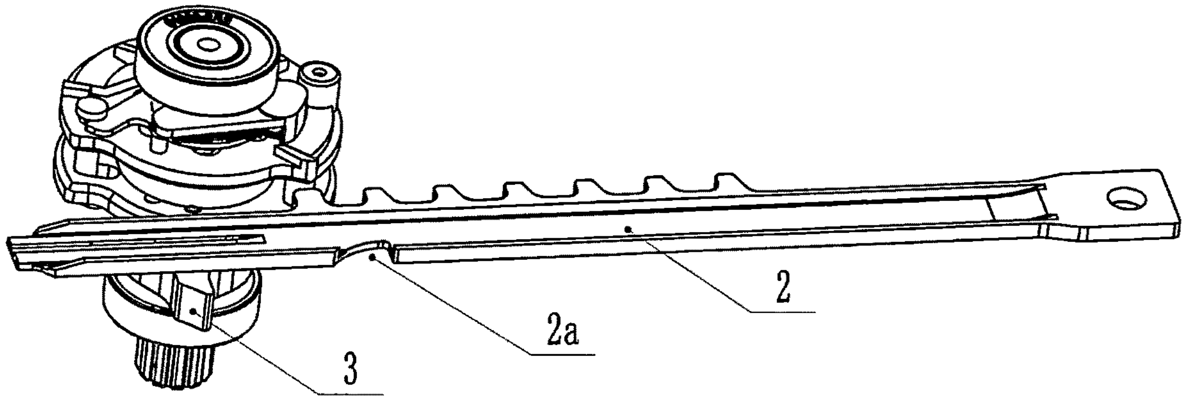
FIG. 2 shows a schematic of the lifting wheel and the striker.

Referencing FIGS. 1 and 2, the power box 1 houses a motor, and a cam 3 is set on the output shaft of the motor. The cam 3 drives the rotation of the locking block 6 through the bolt transmission component, achieving the switch between locking and unlocking modes.

Figure 9:
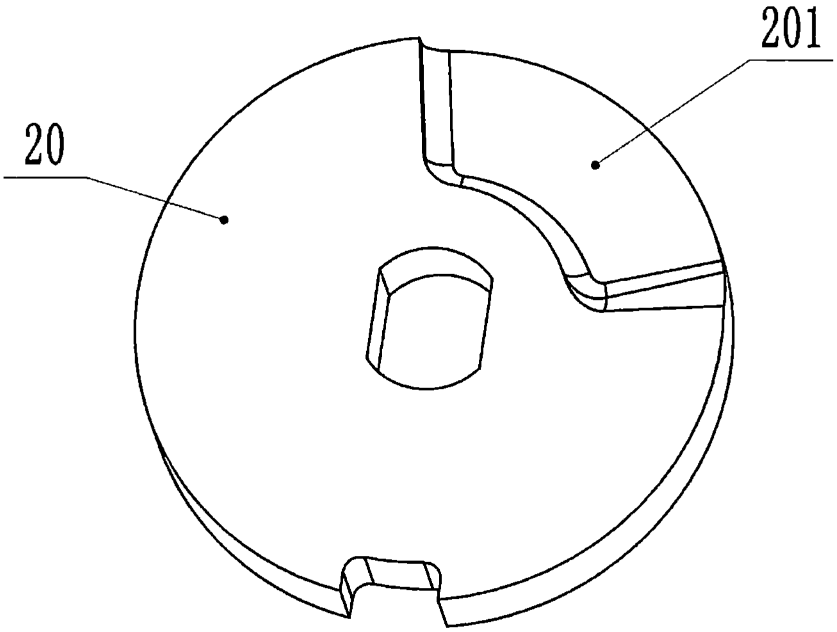
FIG. 9 is a schematic of the synchronization wheel.
Figure 10:
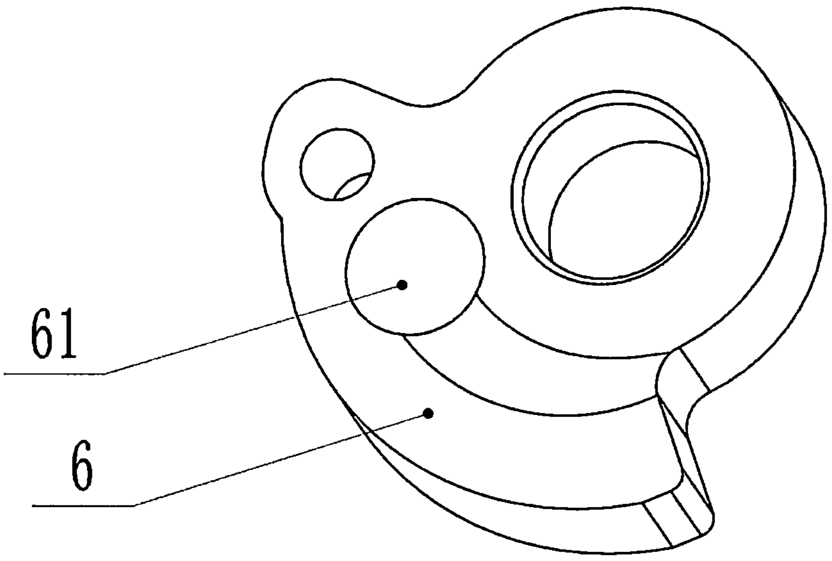
FIG. 10 shows the locking block.

Referencing FIG. 4, the bolt transmission component includes a synchronization shaft 21, a locking seat 5, and a steel ball 15. The synchronization shaft 21 is set on one side of the fixed central shaft 4. The lower end of the synchronization shaft 21 is equipped with a pendulum rod 23, which has a torsion spring 22. The pendulum rod 23 forms a transmission connection with the cam 3 to drive the rotation of the synchronization shaft 21 through swinging. The upper end of the synchronization shaft 21 is equipped with a synchronization wheel 20, whose upper surface is machined to form a ball groove 201 (as seen in FIG. 9). The position of the locking seat 5 is fixed, and it is machined with a lift hole 51 for the passage of the steel ball 15. The lower surface of the locking block 6 is machined to form a spherical groove 61 (as seen in FIG. 10).

Referencing FIG. 3, a guide block 19 is also fixed on the power box 1. The lower surfaces of the locking seat 5 and the guide block 19 partially overlap on the upper surface of the synchronization wheel 20 to ensure the stable rotation of the synchronization wheel 20.

This section details the second embodiment of the present invention, explaining the differences from the first example and describing the operational mechanism of the electric nail gun's locking device.

Figure 11:
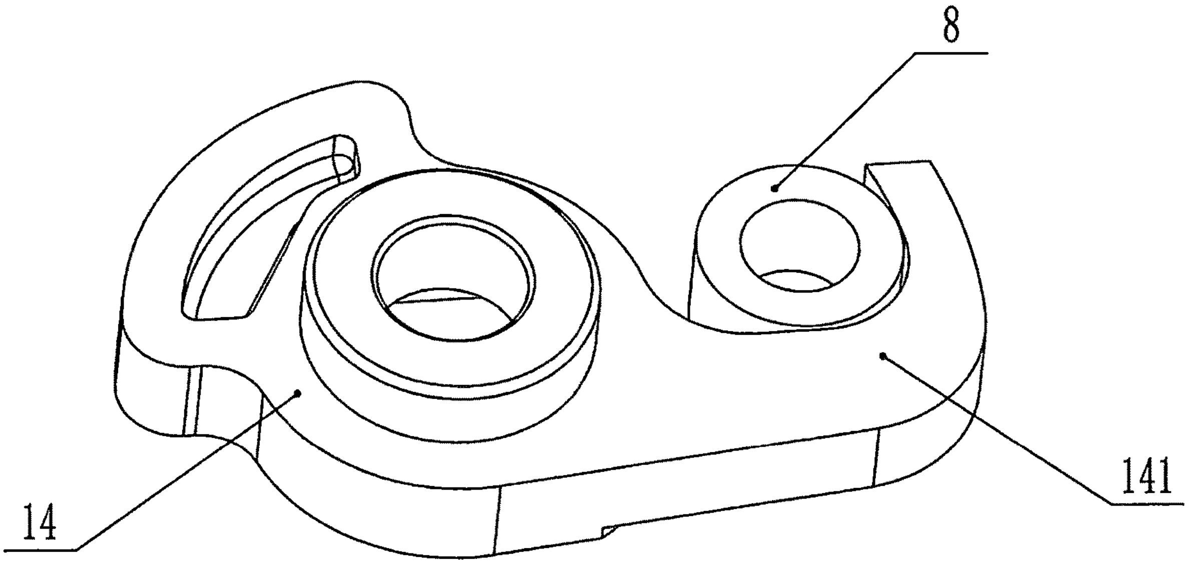
FIG. 11 illustrates the interaction between the guide pad and the sleeve as per Embodiment 2.

Embodiment 2: The difference between this example and Embodiment 1 lies in the shape of the guide part 141 of the guide pad 14. In this example, as shown in FIG. 11, the guide part 141 is curved and hook-shaped, with both of its inner sides tightly adhering to the sleeve 8. This arrangement better prevents the fixed central shaft 4 from bending when subjected to impact forces.

By configuring the guide pad, pressure plate, first bolt, and second bolt, the impact forces and torque exerted on the fixed central shaft are effectively neutralized. This ensures the stability of the fixed central shaft during operation, thereby increasing the durability of the electric nail gun and significantly extending its lifespan.

For a clearer understanding of the present invention, Embodiment 1 is described in conjunction with the accompanying drawings:

Force Analysis of the Fixed Central Shaft: there is a gap fit between the locking block 6 and the fixed central shaft 4 to allow the locking block 6 to rotate without causing the fixed central shaft 4 to rotate (as seen in FIG. 5, the lower end of the fixed central shaft 4 is locked with the power box 1 using a nut and washer). Since the striker 2 is subjected to the high-pressure gas in the piston cylinder, it imparts a counterclockwise torque to the locking block 6. This torque also affects the fixed central shaft 4 to some extent. The guide pad 14, rotating synchronously with the fixed central shaft 4, counters this torque through the guide part 141 resting against the sleeve 8 on the first bolt 9, preventing twisting or loosening of the fixed central shaft 4. Regarding the impact force from the striker 2 on the locking block 6, which can cause the fixed central shaft 4 to bend, the pressure plate 10 pressing on the guide part 141 of the guide pad 14 limits the tilting of the guide pad 14, thereby restricting the bending of the fixed central shaft 4. During the nailing process, the durability of the fixed central shaft 4 is significantly improved.

Locking and Unlocking of the Striker: combining FIGS. 1 and 4, at this stage, the steel ball 15 is located inside the spherical groove 61 of the locking block 6, indicating a locked mode. That is, the locking block 6 is partially embedded in the notch 2*a* of the striker 2, and the striker 2 is in the ready position. When the motor inside the power box 1 rotates, it drives the cam 3, which contacts the pendulum rod 23, causing a slight swing and reset by the torsion spring 22. As the pendulum rod 23 swings, it drives the synchronization wheel 20 to rotate through the synchronization shaft 21. When the ball groove 201 of the synchronization wheel 20 aligns with the lift hole 51 of the locking seat 5, the steel ball 15 leaves the spherical groove 61 of the locking block 6 and falls into the ball groove 201. At this point, the steel ball 15 no longer locks the locking block 6, achieving unlocking. Under the push of high-pressure gas, the striker moves forward to fire, causing the locking block 6 to rotate counterclockwise. The tension spring 17 applies a clockwise torque to the locking block 6. When the lifting wheel resets the striker 2 to the ready position, the locking block 6 can re-engage the notch 2*a* of the striker 2, re-establishing the lock.

The above description is only for the preferred embodiments of the present invention and is not intended to limit the scope of the present invention. Various modifications and variations can be made by those skilled in the art within the spirit and principle of the present invention. Any such modifications, equivalent replacements, improvements, etc., should be included within the scope of protection of the present invention.

We claim:

1. A locking device for an electric nail gun powered by a gas spring, comprising:

a power box (1), a striker (2) movably mounted above the power box (1) with a plurality of evenly spaced ratchets formed on one side and a notch (2$a$) on the other, a fixed central shaft (4) mounted above the power box (1) on the side with the notch (2$a$) of the striker (2), a rotatable locking block (6) on the fixed central shaft (4) engaging or disengaging the notch (2$a$) to lock or unlock the striker (2), a tension spring (17) on the power box (1) resetting the locking block (6) to a locked position, a guide pad (14) maintaining synchronous rotation with the fixed central shaft (4) and located above the locking block (6), a lock nut (12) securing an upper part of the guide pad (14), a pressure plate (10) on the power box (1), fixed perpendicular above the striker (2) and to the striker (2) by a first bolt (9) and a second bolt (11), a sleeve (8) fitted over the first bolt (9), the guide pad (14) including an integral guide part (141), an upper surface of the integral guide part (141) tightly against an underside of the pressure plate (10) and a side surface of the guide part (141) close to the sleeve (8).

2. The locking device for the electric nail gun powered by the gas spring according to claim 1, wherein a middle part of the fixed central shaft (4) has an integral flat part (41), and the guide pad (14) has a flat groove (142) matching the flat part (41); the flat part (41) is press-fitted into the flat groove (142) to achieve synchronized rotation.

3. The locking device for the electric nail gun powered by the gas spring according to claim 1, wherein the first bolt (9) is additionally equipped with a roller (7), positioned below the sleeve (8), to guide the movement of the striker (2).

4. The locking device for the electric nail gun powered by the gas spring according to claim 1, wherein a spring column (16) is fixedly mounted on the locking block (6), and a tension spring bracket (18) is also fixedly mounted on the power box (1); one end of the pull spring (17) is attached to the tension spring bracket (18), and the other end of the pull spring (17) is attached to the spring column (16), thereby maintaining the locking block (6) in a tendency to reset to the locked position.

5. The locking device for the electric nail gun powered by the gas spring according to claim 4, wherein a limit piece (13) is additionally installed on the fixed central shaft (4), located between the guide pad (14) and the lock nut (12), and comprises an integral first limit end (131) and a second limit end (132); upon installation, the first limit end (131) abuts the first bolt (9), while the second limit end (132) serves to restrict the position of the spring column (16).

6. The locking device for the electric nail gun powered by the gas spring according to claim 1, wherein the power box (1) is equipped with an internal motor, and an output shaft of the motor has a cam (3); the cam (3) is driven by a locking transmission assembly, rotates the locking block (6), thereby enabling the switching between locking and unlocking positions.

7. The locking device for the electric nail gun powered by the gas spring according to claim 6, wherein the locking transmission assembly includes a synchronization shaft (21), a locking seat (5), and a steel ball (15); the synchronization shaft (21) is positioned on one side of the fixed central shaft (4), with a lower end of the synchronization shaft (21) equipped with a pendulum rod (23); the pendulum rod (23) has a torsion spring (22) and forms a transmission connection with the cam (3) to drive the rotation of the synchronization shaft (21) through swinging; an upper end of the synchronization shaft (21) has a synchronization wheel (20), an upper surface of the synchronization wheel (20) is machined to form a ball groove (201); the locking seat (5), fixed in position, includes a lift hole (51) machined for the passage of the steel ball (15); a lower surface of the locking block (6) has machined to form a spherical groove (61).

8. The locking device for the electric nail gun powered by the gas spring according to claim 7, wherein the power box (1) also fixed with a guide block (19); the locking seat (5) and the guide block (19) partially overlap on the upper surface of the synchronization wheel (20) to ensure the stable rotation of the synchronization wheel.

9. A locking device for an electric nail gun powered by a gas spring comprising a power box (1), a striker (2) movably mounted above the power box (1) with a plurality of evenly spaced ratchets formed on one side and a notch (2$a$) on the other, a fixed central shaft (4) mounted above the power box (1) on the side with the notch (2$a$) of the striker (2), a rotatable locking block (6) on the fixed central shaft (4) engaging or disengaging the notch (2$a$) to lock or unlock the striker (2), a tension spring (17) on the power box (1) resetting the locking block (6) to a locked position, a guide pad (14) mounted on the fixed central shaft (4), rotating synchronously and located above the locking block (6), with an upper part of the guide pad (14) locked by a lock nut (12);

wherein the power box (1) is also equipped with a pressure plate (10), fixed by a first bolt (9) and the second bolt (11) and set perpendicular to and above the firing pin (2); a sleeve (8) fitted over the first bolt (9); the guide pad (14) includes an integral guide part (141), which is curved and hook-shaped, with both inner sides of the guide part (141) closely attached to the sleeve (8).

* * * * *